June 5, 1951 F. R. MUEHLHAUS ET AL 2,555,756

PLUNGER TYPE MIXER

Filed Sept. 23, 1950

INVENTORS
FRANK R. MUEHLHAUS
MARY MUEHLHAUS
by J. Lloyd La Fave
Attorney

Patented June 5, 1951

2,555,756

UNITED STATES PATENT OFFICE 2,555,756

PLUNGER TYPE MIXER

Frank R. Muehlhaus and Mary Muehlhaus, Milwaukee, Wis.

Application September 23, 1950, Serial No. 186,441

2 Claims. (Cl. 259—113)

This invention relates to a mixing device and more particularly to an improved plunger type mixer especially suited for whipping cream and the like.

It is an object of the present invention to provide an improved plunger type mixer which produces aeration of the mix.

Another object of the invention is to provide an improved plunger type mixer which has relatively free movement upon initiating a stroke of the plunger in either direction.

Another object of the invention is to provide a plunger type mixer which has improved agitation characteristics.

Other objects and advantages of the present invention will be apparent upon reading the following description taken with the accompanying drawing; in which.

Figure 1:
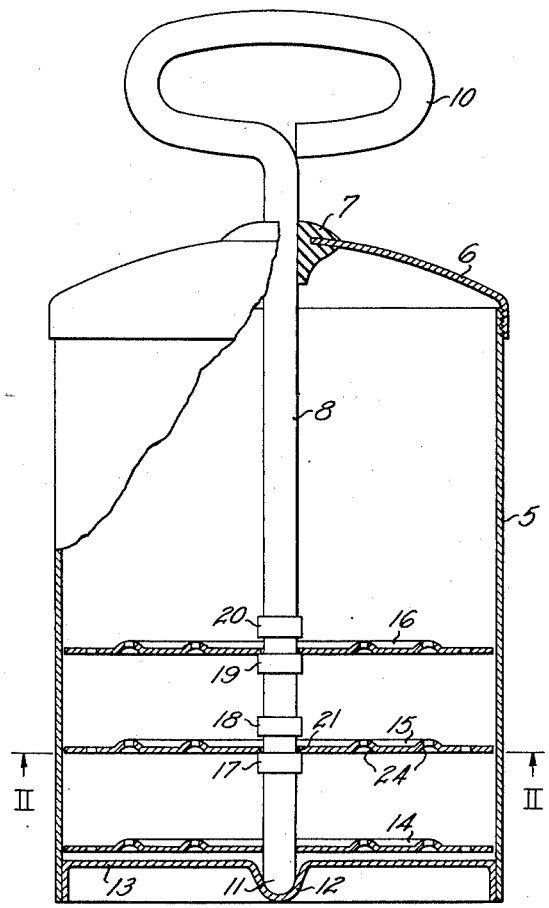
Fig. 1 is a view in elevation of a plunger type mixer embodying the present invention with a portion thereof broken away and shown in section.
Figure 2:
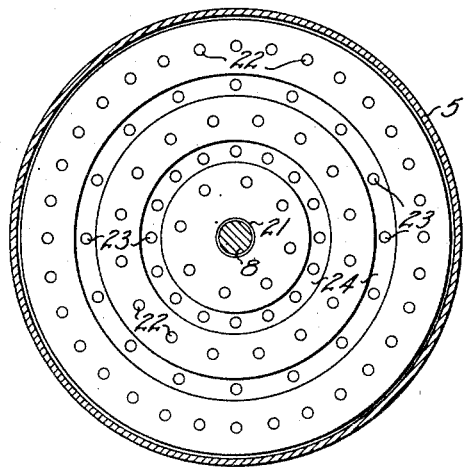
Fig. 2 is a view taken along the line II—II of Fig. 1.

Referring more particularly to the drawing, numeral 5 indicates a suitable open topped cylindrically shaped receptacle made of any suitable material such as glass or stainless steel and having a suitable cover 6 which may seat thereon but which is preferably secured by threaded engagement therewith. The cover 6 is provided with a bushing 7 disposed centrally thereof. A shaft 8 of a dasher or plunger extends through the bushing and is guided thereby when vertically actuated therethrough. The upper end of the shaft is bent to form a handle 10 for the plunger.

The lower end 11 of the shaft is rounded for seating in a cup shaped depression 12 formed centrally in the bottom 13 of the receptacle 5. A plurality of axially spaced discs 14 to 16 are coaxially mounted on the lower portion of the shaft. Disc 14 is fixed securely to the shaft as by welding. The disc 14 may engage the bottom of the receptacle when the plunger is fully inserted or as shown it may just clear the bottom. Discs 15 and 16 are disposed on the shaft above disc 14 and each of the discs 15, 16 are freely supported on the shaft by means comprising a pair of shoulders 17, 18 and 19, 20 respectively. The shoulders 17 to 20 are secured to the shaft in any suitable manner. Each pair of shoulders is spaced sufficiently to permit the disc confined therebetween limited axial movement. Discs 15, 16, each has an aperture 21 slightly larger in size than the shaft diameter so that each disc may wobble as well as move axially on the shaft to a limited extent.

Each of the discs 14 to 16 is provided with a plurality of apertures 22, 23 through which the material being mixed or whipped is forced to pass. Each of the discs also has one or more depressions or uniformly spaced grooves 24 which are preferably circumferentially spaced in the lower face of the disc. The apertures 22, 23 are spaced uniformly in the disc. A plurality of apertures are uniformly spaced in the circumferential grooves.

In the operation of the device with the receptacle containing a quantity of liquid to be mixed, the plunger or dasher shaft is actuated vertically. The bushing 7 and the discs cooperate to keep the plunger substantially aligned with the cup shaped depression. Beginning with the plunger in the upper position, it is forced downward against the liquid. Air temporarily is trapped in the grooves of the disc; but as the plunger moves downward, the air is forced along with liquid through the apertures 23. Liquid is also forced through the other apertures 22 and some liquid also is forced between the periphery of the discs and the walls of the container. Discs 15 and 16 upon initial engagement with the liquid are momentarily stopped thereby until their upper shoulders 18, 20 strike them and force them successively into the liquid. Both discs 15 and 16 are free to wobble slightly with the turbulence of the liquid to further produce turbulence of the liquid and to aid air trapped in the grooves to reach apertures 23 for aerating the mixture.

On the upward stroke of the plunger the discs 15 and 16 are engaged by their lower shoulders 17, 19 and the discs 15, 16 wobble to agitate the mixture. The wobble of the discs accelerates flow of the liquid about the periphery of the discs and to the bottom of the receptacle. The downward and upward strokes of the plunger may be repeated.

Although but one embodiment of the present invention has been illustrated and described, it will be apparent to one skilled in the art that various changes or modifications may be made therein without departing from the spirit of the invention or from the scope of the appended claims.

It is therefore claimed and desired to secure by Letters Patent:

1. A mixing device comprising a cylindrical receptacle having a plunger which may be actuated for movement longitudinally therein, said plunger comprising a shaft and a plurality of discs fixed axially with respect to each other and mounted on said shaft coaxially thereof, each said disc having a plurality of annular grooves in the bottom surface thereof with corresponding said grooves of adjacent said discs being axially aligned, a plurality of spaced apertures being normal to the general plane of said disc, a plurality of said discs each having a central bore larger than the diameter of the shaft portion on which they are mounted to cause said discs to wobble and to rotate about said shaft in response to actuation of said plunger, a plurality of pairs of closely spaced shoulders on said shaft to confine one said disc between each said pair of shoulders for substantially limiting said wobble and said rotation of each said disc about a point in said shaft.

2. A mixing device comprising a receptacle having cylindrical walls and a closed recessed bottom with a cup shaped depression centrally thereof extending downward the extent of the recess of said bottom, a removable top, and a plunger in said receptacle which may be actuated for movement axially thereof, said plunger comprising a shaft having one end extending through said top and the other end seatable in said cup shaped depression, a plurality of axially spaced discs coaxial with said shaft, each said disc having a plurality of uniformly spaced annular grooves in the bottom surface thereof with the corresponding said grooves of adjacent said discs being axially aligned, each said disc having a plurality of apertures in the center of each of said grooves and a plurality of apertures describing a plurality of rings concentric to said grooves with one of said grooves spaced between a pair of said rings, said apertures being formed by walls which are normal to the plane of their respective discs, one of said discs being rigidly secured to the bottom portion of said shaft to lightly engage the bottom of said receptacle when said shaft is seated in said cup shaped depression, the other said discs each having a central bore larger than the diameter of the portion of said shaft on which it is mounted to cause each of said other discs to wobble and to rotate about said shaft in response to actuation of said plunger, closely spaced shoulders on said shaft to confine said other discs axially of said shaft for substantially limiting said wobble and said rotation for each said other disc about a point in said shaft.

FRANK R. MUEHLHAUS.
MARY MUEHLHAUS.

REFERENCES CITED

The following references are of record in the file of this patent:

UNITED STATES PATENTS

| Number | Name | Date |
|---|---|---|
| 570,668 | Kohlenberg | Nov. 3, 1896 |
| 1,243,982 | Rupp | Oct. 23, 1917 |
| 1,572,764 | Chattin | Feb. 9, 1926 |
| 2,166,437 | Howie et al. | July 18, 1939 |

FOREIGN PATENTS

| Number | Country | Date |
|---|---|---|
| 354,403 | Great Britain | Aug. 13, 1931 |